United States Patent [19]

Borsanyi

[11] 4,431,539
[45] Feb. 14, 1984

[54] SEMIPERMEABLE MEMBRANE MASS TRANSFER APPARATUS AND METHOD FOR MAKING SAME

[75] Inventor: Alexander S. Borsanyi, Corona Del Mar, Calif.

[73] Assignee: American Hospital Supply Corp., Irvine, Calif.

[21] Appl. No.: 9,444

[22] Filed: Feb. 5, 1979

Related U.S. Application Data

[63] Continuation of Ser. No. 779,575, Mar. 21, 1977, abandoned.

[51] Int. Cl.³ .............................................. B01D 31/00
[52] U.S. Cl. ................................. 210/232; 210/321.3; 264/257
[58] Field of Search ................. 210/321.3, 493 M, 232; 264/257, 286

[56] References Cited

U.S. PATENT DOCUMENTS 3,612,281 10/1971 Leonard ............................... 210/321
3,723,305 3/1973 Radford ...................... 210/493 M X
3,738,495 6/1973 Esmond ....................... 210/493 M X
3,780,870 12/1973 Esmond ....................... 210/493 M X
3,788,482 1/1974 Markley ...................... 210/493 M X

*Primary Examiner*—Frank A. Spear, Jr.
*Attorney, Agent, or Firm*—Gerald D. Sharkin; Robert S. Honor; Walter F. Jewell

[57] ABSTRACT

The present invention relates to mass transfer apparatus e.g., artificial kidney in which a semipermeable membrane is folded or pleated between top and bottom rectangular plates. Support members are disposed within each pleat on one side only of the membrane. The top and bottom plates are held under a predetermined compressive load while a connecting means with ports is bonded to the opposite side edges of the top and bottom plates. The whole pleated membrane assembly is secured within a housing, with the ports protruding through the housing. The apparatus has reproducible performance characteristics from one device to another.

9 Claims, 1 Drawing Figure

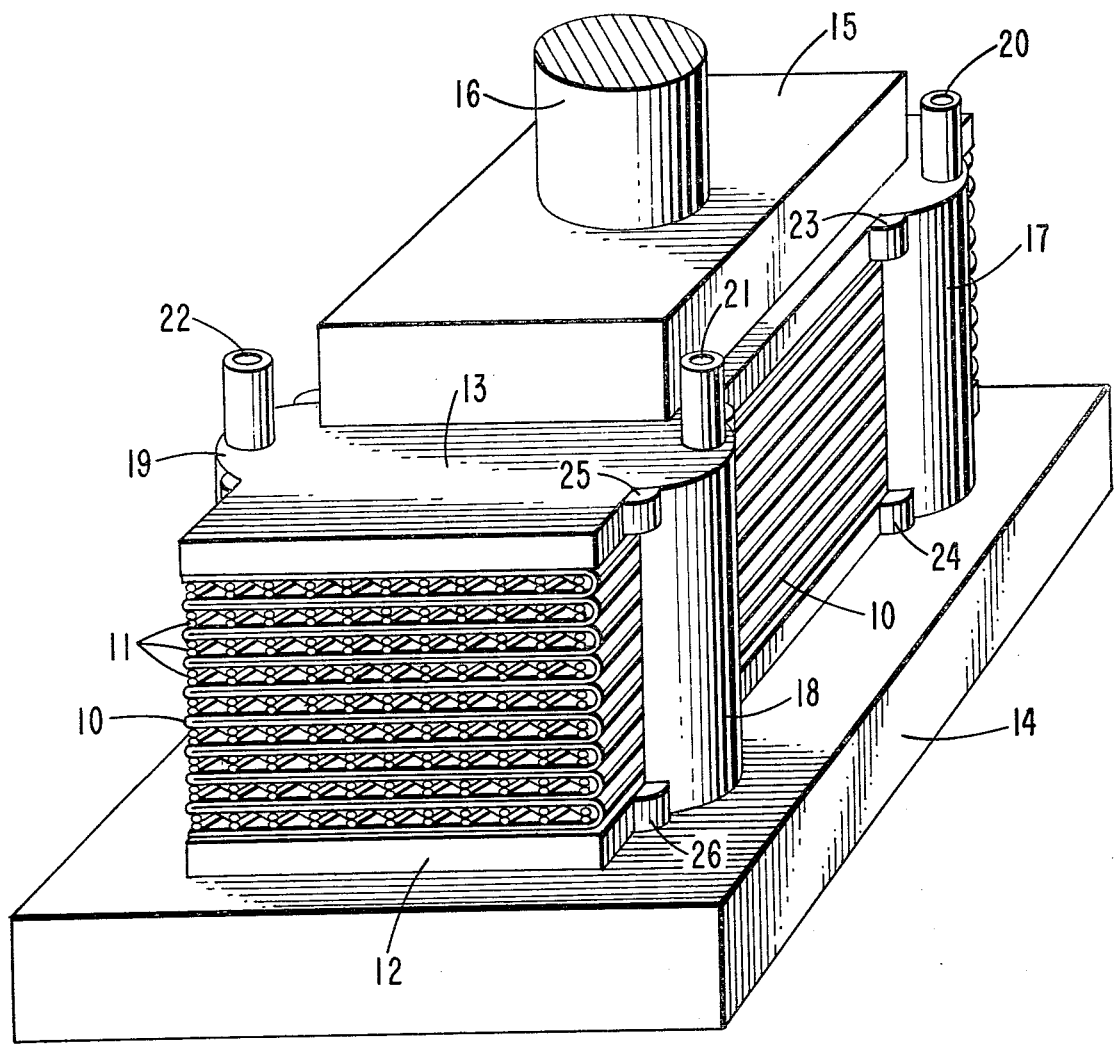

SEMIPERMEABLE MEMBRANE MASS TRANSFER APPARATUS AND METHOD FOR MAKING SAME

This is a continuation of application Ser. No. 779,575, filed Mar. 21, 1977, now abandoned.

BACKGROUND OF THE INVENTION

The pesent invention relates to a mass transfer apparatus for the flow of fluids separated by a planar semipermeable membrane element folded several times upon itself and to a method of manufacturing such an apparatus.

For convenience, the invention is described hereinafter by way of example for the particular case where such an apparatus is used for the treatment of blood by hemodialysis and/or ultrafiltration; and more particularly, such an apparatus which is of relatively small size and weight, economical in operation, and especially suitable to be used at home and then discarded after use.

The invention relates to an improvement in an apparatus comprising a semipermeable membrane folded to form a stack of accordion pleats, disposed inside of a casing, and provided with the necessary ports for the introduction and evacuation of blood, dialysate and/or ultrafiltrate, the pleats of the stack on one side of the membrane containing a plurality of porous or openmesh support members.

An apparatus of this general type is known, as discloed in U.S. Pat. No. 3,788,482. Generally the stack of the membrane in accordion pleats and of the support members is enclosed in a fluid-tight manner inside a housing. This housing may be either a box consisting of essentially two or more pieces suitably joined together for example, or an envelope made out of a suitable plastic material and molded about said stack. These boxes, being made according to a given model, have all exactly the same dimensions and, on the other hand, the mold being the same for all these envelopes, their external dimensions are all identical. Also it has been thought advantageous to have identical apparatuses which have especially stacks of exactly the same height. However, it has now been found that in actual practice the thickness of the membrane, and particularly of the support members, may vary slightly from one apparatus to another and that such slight variations, when multiplied by the number of pleats or number of support elements in a stack, may result in appreciable variations in the thickness of the blood films formed in different apparatuses of the same stack height and same external dimensions. Consequently, the performance and efficiency of these apparatuses may vary at random from one apparatus to another in an undesirable manner, presenting potentially serious problems in a field where reliability and uniformity of operation are deemed essential.

One aspect of this invention therefore lies in recognizing the nature of this problem and its cause; another aspect is concerned with the discovery of a solution to that problem. Specifically, it is an object of the present invention to provide an apparatus having reproducible performance characteristics so that the performance from one such apparatus to another will be substantially identical. It is an object of the present invention to provide an apparatus of the kind indicated that eliminates or at least greatly minimizes problems and disadvantages of the prior art devices.

It is also an object of the present invention to provide an apparatus of simple and economical construction which allows an easy flow of blood under a small pressure drop and with uniform distribution of blood over the entire membrane, and within successive pleats of the same membrane, and which requires only a limited volume of blood within the body of the apparatus.

SUMMARY OF THE INVENTION

In accordance with the present invention, a mass transfer apparatus comprises two rigid and essentially rectangular plates which have uniform thickness and flat opposing surfaces, a semipermeable membrane disposed between said plates, said membrane being a planar membrane folded to form a stack of accordion pleats between the whole internal or opposing surfaces of said plates, a support member being disposed within each pleat on one side only of said membrane, connecting means bonded (by sticking, sealing, melting, welding, soldering, brazing, potting, casting, or the like) to each of said plates along opposite side edges thereof for securing said two plates in parallel positions while maintaining the stack under a uniformly-distributed load of predetermined value, at least three ports for the flow of fluids on both sides of the membrane stack, a housing about said stack, said plates, and said ports, and means for embedding or imperviously sealing the edges of the membrane over its whole length in a fluid-tight manner.

The invention relates also to a method of manufacturing such a fluid flow transfer apparatus. This method comprises the following steps:

(a) Making up an assembly by folding a semipermeable membrane in accordion-like manner into a number of closely spaced pleats around support members inserted into or between the pleats on one side only of said membrane, and placing the accordion-folded stack between a pair of rigid plates each having flat, parallel surfaces;

(b) Introducing said assemblage between the two platens of a press, at least one of which is movable with respect to the other, their opposite faces remaining constantly parallel during all positions of the platens;

(c) Exerting a uniformly-distributed predetermined compressive load on said assemblage by means of said press;

(d) Positioning rigid connecting means, preferably in the form of headers having flow ports, adjacent the side edges of said lower and upper rigid plates of the assemblage, and rigidly bonding them to said plates by sticking, sealing, melting, welding, soldering, brazing, potting, casting, or the like while said assemblage is maintained under said constant load; and (e) Achieving the final potting and overall housing of said assemblage (the plates thereof having been rigidly secured by said connecting means) by any desired per se known means.

A still better understanding of the features of the present invention and its inherent advantages will become apparent from the following description and reference to the accompanying drawing in which the sole FIGURE is a persective view of a hemodialyzer disposed during its construction between the two platens of a press.

DETAILED DESCRIPTION OF THE INVENTION

Referring now to the drawing, it will be seen that the semipermeable membrane 10 is folded in accordion pleats around support members 11 which are disposed only on one side of the membrane. Membrane pleats cover the whole surface of a lower rigid plate 12 which is preferably made of polymethylmethacrylate or other rigid plastic material and whose shape is generally rectangular.

An upper rigid plate 13, generally identical with the lower rigid plate 12, covers the whole surface of the top pleat of the membrane. Each plate is rigid and has flat, parallel upper and lower surfaces. The upper and the lower ends of the membrane may be sealed in a leakproof manner by any desired per se known means respectively to the upper and lower plates, for instance, by means of epoxy, polyurethane resin or other suitable adhesive agent.

Plates 12 and 13 are disposed between the platens 14 and 15 of the press. The opposite faces of the platens 14 and 15 are exactly parallel and must remain parallel when moving one with respect to the other. For example, the platen 14 is fixed while the platen 15 is movable, being attached to the piston 16 of a press. The other elements of the press, being conventional and not critical for an understanding of the present invention, are not shown.

The support members used in this apparatus within the pleats of the membrane may be of various types per se well known in the art for maintaining a suitable spacing between adjacent folds and yet providing a minimum impediment to flow of dialysate. Each takes the form of a spacer comprising a plastic non-woven mesh (e.g., of polyolefin) which has two layers of threads disposed at substantially right angles to each other and then heat sealed, each layer originally being in a different plane. A support member may generally comprise one or two spacers between pleats of the membrane. The membrane may be any flexible and semipermeable membrane of various types as well known in the art, for example known membranes suitable for hemodialysis and treatment of blood by ultrafiltration such as Cuprophan, polyacrylonitrile, etc.

The stack of membrane and support members constitutes a compressible and elastic assemblage whose height may vary depending on the compressive force applied. Furthermore, when the same load or compressive force is applied to different stacks formed of membrane and spacer materials taken from the same sources, stack height variations of from 0.5% to 10% may occur, such variations commonly falling in the range of 2% to 6%. Such variations arise because of minute irregularities or differences in the thickness of materials used for the support elements and membranes of the dialyzers, and because such differences may be magnified by the multiplicity of pleats and support elements required in each apparatus.

According to the present invention, it has been found that greater reproducibility, and in general better results, may be obtained if, although always employing the same conventional elements such as membrane, support members and plates, the stacks of these elements are produced under a uniform predetermined load without regard to whether the final height of one stack differs from another stack having the same number of pleats and spacers. It is to be understood that one may employ either a constant pressure, or a weight or any other suitable means which results in a uniform load distributed evenly over and throughout the stack of membrane and support members by reason of the rigid plates.

This uniform load of a predetermined value may be readily established for an assemblage of any given size and number of pleats, using any given membrane and spacer materials, by a series of simple tests. If the loading is too high, the pressure drop of fluids when traversing the apparatus may be too high and the liquid films may be locally too thin and/or the flow of fluids may be at rates that are too slow, thus adversely affecting the operation and efficiency of the apparatus. In the case of blood, there even may be the risk of coagulating the blood because of the reduced flow. If, on the contrary, the uniform load is too low, the channels offered for fluid flow may be too large and the distribution of fluid inside the apparatus may become preferential as between the different pleats feeding in parallel from a common header, and the rate of circulation locally may become too slow, leading to the same drawbacks mentioned above. At optimum loading, the cross sectional dimensions of the fluid layers within the membrane pleats and the rates of fluid flow therein will provide the best exchange or transfer characteristics for the materials and construction used. Once an optimum compressive loading value has been established to achieve the desired operating characteristics for an apparatus of given size and materials, repeated use of that same loading in the fabrication of similar units will result in apparatuses having essentially the same operating characteristics. Moreover, such reproducibility of operating characteristics will be obtainable even though the stack height of one assembly may differ from that of the next because of virtually indetectable variations in the thickness of the multiple support members, and sometimes even of the membranes, used in successive assemblies.

According to the present invention, the uniform compressive load is applied to rigid plates which have flat parallel faces and which remain constantly parallel to each other, the stack of membrane pleats and spacer elements being disposed therebetween. It has been found that this disposition promotes the uniform distribution of fluids within the pleats of the membrane when the apparatus so formed is put to use. Thus, according to the invention, rigid plates 12 and 13 are maintained parallel to each other under a uniform pre-established loading, and without regard to differences in the spacing of such plates from one apparatus to another, and are thereafter fixed to each other by connecting means bonded to the opposite longitudinal side edges of the upper and lower plates. Advantageously, the connecting means comprises a plurality of rigid elements which extend vertically and are bonded to the side edges of the plates adjacent the corners thereof.

The connecting elements may take the form of bars, rods, sheets, plates, etc., which extend from one plate to the other adjacent the creases of the membrane. Such elements may be stuck, sealed, melted, welded, soldered, brazed, potted, cast, or the like, to form rigid links between the side edges of the two plates. If desired, they may be integral with one or the other of the two plates.

A preferred embodiment of the invention consists is using fluid-conducting headers such as 17, 18, 19 as the rigid connecting elements between the lower plate and the upper plate. Each header has an inwardly-facing vertical channel which communicates with all the pleats of the stack on the side of the membrane facing that header and is otherwise closed except for a port advantageously provided with a short pipe such as 20, 21, 22 to which a suitable tube may be connected in a fluid-tight manner. Such headers are bonded to the side edges of the lower and the upper plates, for example at the points 23, 24, 25, 26, etc., while the assemblage is maintained under a predetermined, uniform, and constant load. Since the headers are bonded to the plates, rather than being mechanically latched to such plates, the step of securing the headers may be easily achieved without imposing any forces on the plates which might alter their spacing or which might permit any significant changes in such spacing after the bonding action is completed and the assembled structure is removed from the press.

The desired construction of the apparatus is then achieved by bringing about the peripheral fluid-tightness by means known per se to the art. For instance, it is possible to introduce the assemblage (with the headers) into a mold and to cast in the mold a fluid resin for enclosing that assemblage. It is also possible to employ a box (equipped with port openings for receiving tubes or pipes 20, 21, 22, etc.), for example in two pieces, and to cast a fluid resin around the assemblage inside the assembled box. Thus the edges of the membranes may be sealed over their whole length.

The apparatus has been described in a form particularly adapted for use as a hemodialyzer provided with four ports, two for blood and two for dialysate, for treatment of blood. Alternatively, there may be provided one port only for the exit of ultrafiltrate. In each of these cases, the features described above improve the circulation of blood or other fluid and hence the efficiency of the apparatus.

This apparatus is also convenient for any other treatment of blood, for instance as a blood oxygenator in an artificial lung.

Moreover, the terms "blood" and "dialysate" are employed herein merely by way of example and to identify any fluids flowing through the channels and ports, and are used merely for convenience of exposition and are to be construed as including other fluids. Also other types of membranes or folded sheets may be employed, as dictated by the particular fluids and by the nature of the desired transfer between the fluids.

It is to be particularly emphasized that one of the main advantages of the present invention is that it enables one to manufacture a series of like devices which, because of the application of the same predetermined uniform load or force during manufacture of each of the devices of the series, will have essentially the same operating characteristics during use, despite minute differences in the thickness of the membranes and/or support members of each of the devices of the series.

What is claimed is:

1. A method of manufacturing a mass transfer apparatus comprising two rigid and essentially rectangular plates having flat parallel opposing surfaces; a semipermeable membrane disposed between said plates; said membrane being folded to form a stack of accordion pleates over substantially the whole internal surface of said plates, a support member being disposed within each pleat on one side only of said membrane; connecting means bonded to opposite side edges of said plates for keeping said two plates in parallel positions while maintaining said stack under a compressive load of predetermined value; at least three ports for the flow of fluids with at least one port on each side of the membrane stack; a housing enclosing said membrane stack, said plates, and said connecting means, with openings for said ports being exposed; and means for embedding imperviously the edges of the membrane over its whole length, comprising the following steps:
   (a) Making up an assemblage comprising a semipermeable membrane folded in accordion-like manner into a number of closely spaced pleats around support members inserted into or between the pleats on one side only of said membrane, the folded membrane and support members being disposed between two flat and rigid plates of uniform thickness;
   (b) Introducing said assemblage between the two platens of a press, at least one of which is movable with respect to the other, their opposing faces remaining constantly parallel during all positions of the platens;
   (c) Exerting a predetermined compressive load on said assemblage by means of said press;
   (d) Connecting the opposing side edges of said lower and upper rigid plates of the assemblage by sticking, sealing, melting, welding, soldering, brazing, potting, casting, or the like, while said assemblage is maintained under said uniformly distributed and predetermined load; and
   (e) Achieving the overall housing of said apparatus by any desired per se known means.

2. A method as claimed in claim 1, wherein the said predetermined compressive load is uniformly distributed on said assemblage.

3. A method of manufacturing a mass transfer apparatus comprising two rigid and essentially rectangular plates having flat parallel opposing surfaces; a semipermeable membrane disposed between said plates; said membrane being folded to form a stack of accordion pleates over substantially the whole internal surface of said plates, a support member being disposed within each pleat on one side only of said membrane; connecting means bonded to opposite side edges of said plates for keeping said two plates in parallel positions while maintaining said stack under a compressive load of pedetermined value; at least three ports for the flow of fluids with at least one port on each side of the membrane stack; a housing enclosing said membrane stack, said plates, and said connecting means, with openings for said ports being exposed; and means for embedding imperviously the edges of the membrane over its whole length, comprising;
   (a) making up an assembly by folding a semipermeable membrane in accordion-like manner into a stack of several closely-spaced pleats around support members disposed within the pleats on one side of said membrane, and placing the accordion-folded stack containing said support members between a pair of rigid plates each having flat, parallel surfaces;
   (b) Applying a predetermined and uniformly-distributed compressive load on said assembly while maintaining said plates in parallel relationship; and
   (c) Bonding a plurality of rigid vertically extending connecting members to opposite side edges of said upper and lower plates while said assembly is maintained under said predetermined and uniformly-distributed load.

4. A mass transfer apparatus comprising two rigid and essentially rectangular plates having flat parallel opposing surfaces; a semipermeable membrane disposed between said plates; said membrane being folded to form a stack of accordion pleats over substantially the whole internal surface of said plates, a support member being disposed within each pleat on one side only of said membrane; connecting means comprising at least three fluid conducting headers with at least one fluid conducting header on each side of the membrane stack bonded to the edges of said plates for keeping said two plates in parallel positions while maintaining said stack under a compressive load of predetermined value; a housing enclosing said membrane stack, said plates, and said fluid conducting headers with openings for said fluid conducting headers being exposed; and means for embedding imperviously the edges of the membrane over its whole length.

5. An apparatus as defined in claim 4 in which the fluid conducting headers are bonded to the side edges of the rectangular plates adjacent the four corners thereof.

6. An apparatus of claim 4, in which each support member is planar and comprises at least one spacer formed of a plastic non-woven mesh which has two layers of threads heat sealed together, each layer being in a different plane prior to heat sealing.

7. An apparatus of claim 4, wherein the said connecting means maintain said stack under a uniformly-distributed compressive load of predetermined value.

8. A method of manufacturing a mass transfer apparatus as defined in claim 4 comprising;
  (a) Making up an assembly by folding a semi-permeable membrane in accordion-like manner into a stack of several closely spaced pleats around support members disposed within the pleats on one side of said membrane, and placing the accordion-folded stack containing said support members between a pair of rigid plates each having flat, parallel surfaces;
  (b) Applying a predetermined and uniformly-distributed compressive load on said assembly while maintaining said plates in parallel relationship; and
  (c) Bonding a plurality of headers having ports for the flow of fluids into and out of the assembly on both sides of the membrane stack while said assembly is maintained under said predetermined and uniformly-distributed load.

9. A method as claimed in claim 8, wherein the said predetermined compressive load is uniformly distributed on said assemblage.

* * * * *